United States Patent [19]

Vancraeynest

[11] Patent Number: 5,093,841
[45] Date of Patent: Mar. 3, 1992

[54] CLOCK ACQUISITION IN A SPREAD SPECTRUM SYSTEM

[75] Inventor: Jan P. Vancraeynest, White Plains, N.Y.

[73] Assignee: NYNEX Corporation, White Plains, N.Y.

[21] Appl. No.: 472,325

[22] Filed: Jan. 30, 1990

[51] Int. Cl.[5] .......................................... H04L 27/30
[52] U.S. Cl. ........................................ 375/1; 380/34; 380/48; 375/114; 375/116; 375/120
[58] Field of Search ................. 375/1, 107, 110, 111, 375/114, 116, 119, 120, 79, 115; 328/155, 63; 455/260; 380/34, 48

[56] References Cited

U.S. PATENT DOCUMENTS

| | | | |
|---|---|---|---|
| 3,447,085 | 5/1969 | Haas et al. ............................. | 375/79 |
| 3,502,976 | 3/1970 | Chamberlin, Jr. et al. .... | 328/155 X |
| 3,646,452 | 2/1972 | Horowitz et al. ..................... | 328/63 |
| 3,742,372 | 6/1973 | Uchida et al. ......................... | 328/63 |
| 4,423,517 | 12/1983 | Danno et al. ............................ | 375/1 |
| 4,475,208 | 10/1984 | Ricketts ................................. | 380/34 |
| 4,559,633 | 12/1985 | Kan et al. ................................ | 375/1 |
| 4,639,932 | 1/1987 | Schiff ...................................... | 375/1 |
| 4,774,715 | 9/1988 | Messenger .............................. | 375/1 |
| 4,862,484 | 8/1989 | Roberts .................................. | 375/14 |

Primary Examiner—Bernarr E. Gregory
Attorney, Agent, or Firm—Loren C. Swingle; Kenneth Rubenstein

[57] ABSTRACT

A circuit and method is disclosed for recovering the transmitter clock at a receiver in a direct sequence spread spectrum communication system where a transmitter and receiver run independent clocks of nominally the same frequency. At the receiver, to select the phase of the local clock that yields the strongest signal, a clock recovery circuitry cycles through M phases of the locally generated receiver clock. The cycling is halted and the phase is locked soon as an indication is obtained that a phase is valid. Alternatively, all M phases of the local clock are tested for validity or invalidity, and depending on the resulting pattern of valid and invalid phases, a particular phase is selected for the local clock. A phase is valid or invalid depending on whether there is a second correlation crossing at the expected instant one data bit period after a first correlation crossing.

22 Claims, 4 Drawing Sheets

| $\phi_0$ | $\phi_1$ | $\phi_2$ | $\phi_3$ | SELECTED PHASE |
|---|---|---|---|---|
| VALID | VALID | VALID | VALID | $\phi_0$ |
| INVALID | VALID | VALID | VALID | $\phi_2$ |
| VALID | INVALID | VALID | VALID | $\phi_3$ |
| VALID | VALID | INVALID | VALID | $\phi_0$ |
| VALID | VALID | VALID | INVALID | $\phi_1$ |
| INVALID | INVALID | VALID | VALID | $\phi_2$ |
| VALID | INVALID | INVALID | VALID | $\phi_3$ |
| VALID | VALID | INVALID | INVALID | $\phi_0$ |
| INVALID | VALID | VALID | INVALID | $\phi_1$ |

CLOCK ACQUISITION IN A SPREAD SPECTRUM SYSTEM

FIELD OF THE INVENTION

The present invention relates to a circuit and a method for synchronizing receiver operation with transmitter clock frequency in a packetized spread spectrum communication system.

BACKGROUND OF THE INVENTION

Spread spectrum techniques permit data signals to be extracted from noise with a relatively small error rate. In a spread spectrum system, a binary 1 data bit is represented by a first sequence of binary states or elements called chips, and a binary 0 data bit is represented by a second sequence of binary chips. Each sequence of binary chips is known as a spreading sequence. Typically, the second sequence of chips is the complement of the first sequence of chips. Thus, in a spread spectrum coding system, the basic unit of data, i.e., the data bit, is encoded by forming a sequence of chips. The chip rate is much higher than the data rate and each chip has a much broader frequency spectrum than a data bit. Since each chip has a frequency spectrum that is spread much wider than the frequency spectrum of the original data bit, the technique is known as spread spectrum.

At a receiver, a stream of data bits which has been transmitted using the spread spectrum format is recovered using a process known as despreading. Despreading involves correlating the received signal which comprises chips with a local reference chip sequence. The local reference utilizes the same chip sequence that was used to encode the data bits at the transmitting end. Illustratively, the reference sequence is stored at the receiver. The signal comprising the received chips is entered into a shift register and for each chip time period, the received chips are advanced one position in the shift register. At each chip time period, the number of matches between the prestored reference sequence and the received chips in the shift register is obtained.

Consider the case where the reference sequence corresponds to a binary 1 data bit and the binary 0 data bit is represented by the complement of the reference sequence. In this case, when the number of matches exceeds a predetermined upper correlation threshold, a data detection decision is made indicating the presence of a binary 1 data bit. When the number of matches falls below a predetermined lower correlation threshold, a data detection decision is made indicating the presence of a binary 0 data bit. In between the data decision times, when there are portions of two consecutive spreading sequences in the shift register (i.e. the end portion of one sequence and the beginning of the next sequence), the number of matches should fall in between the high and low thresholds, thus preventing erroneous data detection decisions.

In a noise free system, the presence of a binary 1 will be indicated by a total match between the received chips in the shift register and the reference sequence. Similarly, the presence of a binary 0 will be indicated by no matches between the received chips in the shift register and the reference sequence. However, in real systems, noise prevents all the chips in a spreading sequence from being correctly received so that binary 1 and binary 0 data detection decisions are based on whether the number of matches is above or below upper and lower predetermined correlation thresholds, respectively. This process has the effect of averaging out random noise. Thus, the despread signal component is enhanced and the noise component is reduced.

In short, in a spread spectrum communication system, at an encoder or spreader, each data bit in a data bit stream is encoded by transmitting a sequence of binary chips. Typically, one such spreading sequence is used to represent a binary 1 and its complement is used to represent a binary 0. The chips representing the data bit stream are modulated onto a carrier using a conventional two-level modulation technique such as binary phase shift keying (BPSK) or frequency shift keying (FSK) and transmitted to a decoder or a despreader. At the decoder or despreader, the chips are demodulated and correlated with a reference sequence to reconstruct the original data bit stream.

In a spread spectrum system, the transmitter and the receiver run independent clocks of nominally the same frequency. It is the local receiver clock signal which clocks the arriving chip stream through the shift register. To obtain the strongest decorrelated data bit stream signal, it is desirable that the local receiver clock be synchronized with and track the phase of the arriving chip stream signal.

Various techniques have been proposed to enable the local clock to track the phase of the arriving chip stream so as to recover the clock of the arriving chip stream. These clock recovery techniques include the use of phase locked loops or banks of correlators (see e.g. Messenger, U.S. Pat. No. 4,774,715) to select the appropriate phase of the local clock. These prior art techniques offer powerful tracking capabilities which allow the transmitting and receiving clocks to vary widely in frequency. However, if the receiver only needs to have the correct local clock for a short time, such as in the case of packet communications employing short packets, the abovementioned powerful, but complex clock-recovery techniques for the local clock are not necessary. It pays to give up the powerful tracking capabilities of the prior art clock recovery techniques which are not needed because of the finite size of the packets, and instead, simplify the clock recovery technique at the local receiver and reduce the acquisition time needed at the receiver to obtain the correct local clock.

Accordingly, it is an object of the present invention to provide a simplified clock recovery method and circuit for rapidly selecting an appropriate phase of a local receiver clock to synchronize the local clock with an arriving stream of chips in a spread spectrum communication system.

It is a further object of the present invention to provide a simplified clock recovery method and circuit for synchronizing a local clock to an arriving chip stream, which method and circuit are especially useful in connection with the receiving of short packets in a spread spectrum communication system.

SUMMARY OF THE INVENTION

In accordance with an illustrative embodiment of the present invention, a spread spectrum receiver rapidly acquires the correct phase of a locally generated clock by cycling through M (M > 1) phases of the local clock. The cycling is halted and the phase of the local clock is locked as soon as an indication is obtained that one of the phases is valid. The cycling through the M phases occurs at a speed which allows sufficient time for this indication to be asserted.

In a spread-spectrum communication system of the type described above, wherein each data bit is encoded at a spreader by a sequence of chips at a higher chip rate, a suitable indication that a particular phase of the local clock is valid is that at a despreader the correlation thresholds are exceeded at the expected times. For spreading sequences comprising N chips per bit, the high or low correlation threshold should be exceeded every $N^{th}$ chip. Illustratively, the indication used in the present invention to indicate that a particular phase of the local clock is valid is that the next correlation threshold crossing occurs N chip periods after the present threshold crossing.

Consequently, for each phase of the local clock, it takes 2N chip periods for this indication to be asserted, N chip periods to reach the first threshold crossing and another N chip periods to check that the next threshold crossing falls at the correct instant. This means that the receiver can cycle through its M possible local clock phases at a rate of one-half the frequency of the recovered data bit signal. In other words, two data bit periods are utilized to test each of the M possible phases of the local clock so that clock acquisition takes place within a time which does not exceed 2M bit periods. In the case where M=4 (i.e. four clock phases each 90° delayed from the previous phase), clock acquisition will occur within $4 \times 2 = 8$ bit periods. Thus, it can be seen from the foregoing that the clock acquisition mechanism of the present invention is both simple and fast.

Illustratively, in the case where packets are being received, 2M bit periods defines a lower limit on the packet preamble. A time of 2M bit periods is typically sufficiently short so that the radio-propagation environment may be viewed as constant.

Once the correct local clock phase is acquired, the same clock phase is utilized until the slippage between transmitter clock and local receiver clock causes a loss of synchronization. Preferably, where packets are being received, the packet length is sufficiently short such that a full packet is received before such loss of synchronization occurs, so that clock acquisition need be performed only once per packet. Thus, in particular systems, this may place an upper limit on packet size.

It should be noted that use of M phases of the local receiver clock is equivalent to the time resolution that would be obtained by using a clock frequency M times higher (i.e. M times oversampling), without the increased power consumption and cost of the higher clock frequency.

In an alternative embodiment of the invention, instead of sequentially cycling through the phases of the local clock and halting the cycling and locking the phase as soon as indication is obtained that one of the phases is valid, all M phases of the local clock are tested. An indication of valid or invalid for each phase is obtained based on the relative timing of correlation threshold crossings obtained for each phase. Base on the pattern of valid and invalid phases, the best phase of the local clock is chosen. In a packetized spread spectrum system, this local clock determination process is carried out once per packet.

Illustratively, an indication that a particular phase is valid is that the current threshold crossing obtained with th current phase occurs N chip periods after a previous threshold crossing obtained with a previous phase. An indication that a particular phase is invalid is that a current threshold crossing for a current phase does not occur as expected N chip periods after a previous threshold crossing obtained with a previous phase.

Once a pattern of valid and invalid indications are obtained for all M phases of the local clock, a table stored in a memory may be utilized to look up the best clock phase.

This alternative recovery scheme has the advantage that it enables the phase of the local clock which will remain valid for the longest duration to be utilized rather than merely the first tested phase which happens to be valid.

Briefly, a unique clock recovery method and circuit for a spread spectrum communication system has been disclosed, wherein M phases of a locally generated receiver clock are cyclically tested for validity by determining whether or not a second data bit is recovered at the expected instant after a first data bit is recovered. The phase is locked as soon as an indication is obtained that one of the phases is valid. Alternatively, all M phases of the local clock are tested for validity or invalidity and the best phase of the local clock is selected based on the particular pattern of valid and invalid phases.

DETAILED DESCRIPTION OF THE INVENTION

Before describing the clock recovery techniques of the present invention, it may be helpful to briefly review the direct sequence spread spectrum technique.

In accordance with the direct sequence spread spectrum technique, each data bit in a data bit stream is mapped into a sequence of chips known as a spreading sequence. Consider the following example:

binary 1→(first)110110010100001(last)

binary 0→(first)001001101011110(last)

wherein the spreading sequence for binary 0 is the complement of the spreading sequence for binary 1 and wherein (first) and (last) indicate the order in which the chips are transmitted. The chip rate is much higher than the data bit rate and each chip has a much wider frequency spectrum than a data bit. The spreading sequence corresponding to each bit in the data bit stream is modulated onto a carrier, preferably using a simple two level modulation scheme such as BPSK or FSK, and transmitted to a remote receiver.

Figure 1A:
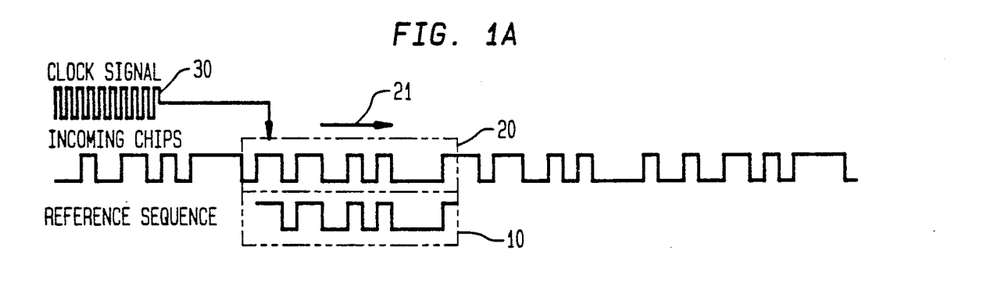
FIGS. 1A and 1B illustrate the conventional spread spectrum communication technique.

At a receiver, the received spreading sequences are correlated with a reference sequence to convert the spreading sequence back into data bits. FIG. 1A shows a reference sequence which is the same as the spreading sequence for binary 1 identified above. Illustratively, the reference sequence is stored in a correlator 10 which is schematically illustrated in FIG. 1A. FIG. 1A also shows the incoming chips. The incoming chips are entered into a shift register 20 schematically illustrated in FIG. 1A. The incoming chips are shifted one position in the shift register (i.e. in the direction of arrow 21) at each triggering transition of the local receiver clock signal 30 schematically illustrated in FIG. 1A. Illustratively, a triggering transition (e.g. a rising edge of a clock pulse) occurs once in each clock signal period. Desirably, the triggering transition occurs in the center of the corresponding chip.

The clock signal 30 nominally has the same frequency as the incoming chip signal. A clock recovery circuit is utilized at the receiver to choose a phase of the clock signal 30 so that the clock signal 30 is synchronized with the incoming chip signal. One method and circuit for acquiring the correct phase of the local clock signal 30 in accordance with an illustrative embodiment of the present invention is discussed below in connection with FIG. 3. An alternative method and circuit for acquiring the correct phase of the local clock in accordance with an alternative illustrative embodiment of the parent invention is discussed below in connection with FIGS. 4, 5, 6A-6E and 7A-7C.

Figure 1B:
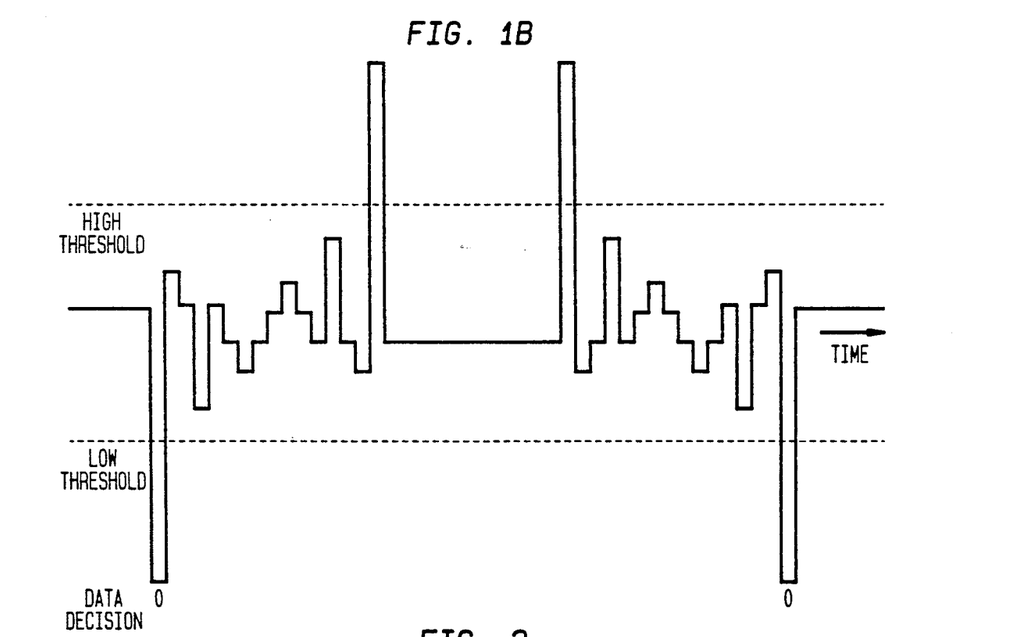

To correlate the incoming chips with the reference sequence, at each chip time period, the chip values stored in the shift register are compared with the reference sequence and the number of matches is counted. The number of matches is plotted as a function of time in FIG. 1B. Note that the plot of FIG. 1B has a high correlation threshold and a low correlation threshold. In any chip time period, when the number of matches exceeds the high threshold, a data detection decision is made indicating the presence of a binary 1 data bit. Similarly, when the number of matches falls below the low threshold, a data detection decision is made indicating the presence of a binary 0 data bit. In FIG. 1B four such data detection decisions are illustrated.

In the absence of noise, a binary 1 data bit would be indicated by a complete match between the reference sequence and the received chips in the shift register. Similarly, a binary 0 data bit would be indicated by a complete mismatch between the reference sequence and the received chips in the shift register because a binary 0 data bit is encoded with the complement of the reference sequence. However, because in a noisy environment there is a certain chip error rate, a data detection decision indicating a binary 1 or a binary 0 data bit is made when the number of matches exceeds or falls below high and low correlation thresholds, respectively. As indicated previously, this correlation process has the effect of averaging out random noise so that the signal component is enhanced and the noise component is reduced.

In connection with FIG. 1B, it should be noted that at times when a complete received spreading sequence is not being compared with the reference sequence (i.e. between data decision times) the number of matches falls in between the high and low thresholds If no additional bit timing information is to be used, only at data decision times should the number of matches fall outside the correlation thresholds. For this reason, the spreading sequences utilized to code the binary 1 and binary 0 data bits have a single autocorrelation peak, low autocorrelation side lobes and low cross and partial correlations.

In FIG. 1B each of the illustrated data detection decisions is separated from the previous data detection decisions by $N=15$ chip time periods. This is indicative that the local clock is operating in a valid phase because in the example of FIGS. 1A and 1B, $N=15$ chips are used to encode each data bit so that data decisions would be expected every $N=15$ chip time periods.

In accordance with one illustrative embodiment of the present invention, the correct phase of the local clock is obtained by cycling through M possible phases of the local clock and then locking the phase of the local clock when an indication is received that a particular one of the M phases is valid. The phase of the local clock remains locked until such time as the local clock and the clock of the arriving chip stream lose synchronism in which case the step of cycling through the M phases resumes until a new valid local clock phase is found. Preferably, the criterion for determining that synchronization has been lost is that a number of consecutive threshold crossings do not occur at the expected instants or do not occur at all.

The indication that a particular local clock phase is valid is that a second data bit is detected at the expected instant, N chip periods after a first data bit is detected. In other words, an indication that a particular phase is valid is that there is a second correlation threshold crossing at the expected instant, N chip time periods after a first correlation threshold crossing. This means that it takes 2N chip periods (i.e. two data bit periods) to test each of the M phases, N chip time periods to get the correlation peak of the first N chips and another N chip time periods to check that next correction peak occurs at the correct instant. Thus it takes a maximum of 2 MN chip periods or 2M bit periods to acquire the correct phase of the local clock.

Figure 2:
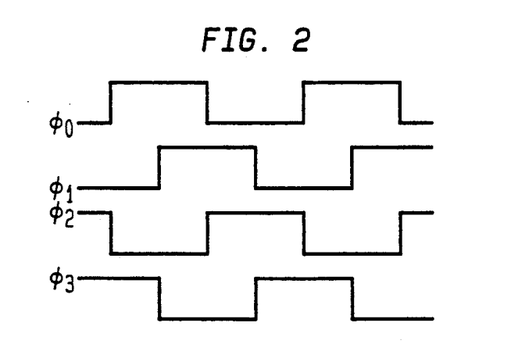
FIG. 2 shows four phases of a local receiver clock signal.

FIG. 2 illustrates $M=4$ phases of a local clock. The $M=4$ phases are labeled $\phi_0$, $\phi_1$, $\phi_2$, and $\phi_3$. Each of these phases is delayed 90° from the previous phase.

Figure 3:
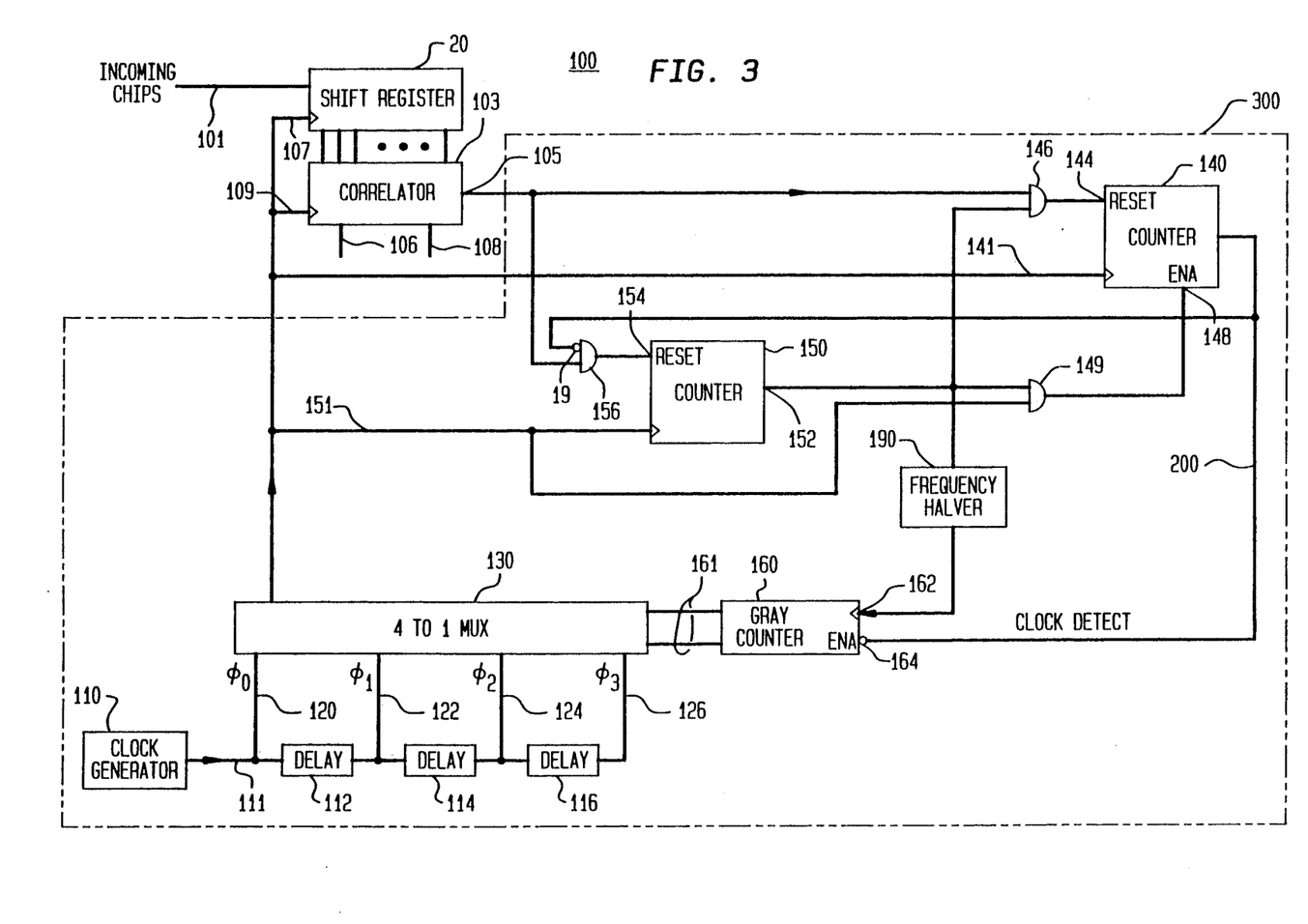
FIG. 3 schematically illustrates a despreader for use in a spread spectrum communication system including a clock recovery circuit for carrying out a particular clock recovery scheme in accordance with an illustrative embodiment of the present invention.

FIG. 3 schematically illustrates a despreader 100 including a clock recovery circuit 300 which operates in accordance with one illustrative embodiment of the present invention. The despreader 100 serves to reconstruct a data bit stream from an incoming stream of chips in a spread spectrum format. The incoming chip stream is received at the shift register 20 on line 101. At each chip time period, the chips in the shift register are compared with a reference sequence stored or otherwise programmed or generated in the correlator 103. When the number of matches between the chips in the shift register and the reference sequence falls below a low correlation threshold a signal indicating a binary 0 data bit is asserted on line 106. Similarly, if the number of matches exceeds a high correlation threshold, a signal indicating a binary 1 data bit is asserted on line 108. Whenever either correlation threshold is exceeded, a data bit detection signal is asserted at the output 105 of the correlator 103.

The timing for the shift register 20 and for the correlator 103 is provided by a local clock signal on lines 107 and 109, respectively. If the clock signal on lines 107 and 109 does not have the correct phase the strongest reconstructed data bit signal is not obtained.

Illustratively, the clock signal on lines 107 and 109 is chosen from M=4 possible phases. The M=4 possible clock phases are generated as follows. A clock generator 110 generates a periodic signal on line 111 which has the same nominal frequency as the chip stream on line 101. The sequentially connected delays 112, 114 and 116 each provide a 90° delay so that the signals on lines 120, 122, 124, and 126 each have a 90° delay with respect to the signal on the previous line, i.e. the signal on line 122 is delayed 90° with respect to the signal on line 120, the signal on line 124 is delayed 90° with respect to the signal on line 122, and the signal on line 126 is delayed 90° with respect to the signal on line 124. Thus, the phases $\phi_0$, $\phi_1$, $\phi_2$, and $\phi_3$ of FIG. 2 are present on the lines 120, 122, 124, and 126, respectively, of FIG. 3. Alternatively, the four phases may be generated from a single frequency at four times the desired frequency using a divide-by-four circuit, as is well known in the art. Of the four phases on lines 120, 122, 124, and 126, the 4:1 multiplexer 130 selects one of the phases for transmission to the shift register 20 via line 107 and to the correlator 103 via line 109 as well as to the counter 140 via line 141 and the counter 150 via line 151.

The multiplexer 130 is controlled by the Gray Counter 160 such that consecutive states of the Gray Counter 160 on the lines 161 select adjacent phases of the local clock. The Gray Counter is clocked at one-half of the data bit frequency at its clock input 162. This means that the output state of the Gray counter at lines 161 changes at 2N chip period intervals allowing time for each selected clock phase to be tested for validity. The clock signal for the Gray counter 160 at the clock input 162 is derived from the output 152 of counter 150 via the frequency halver 190.

The Gray counter 160 is only enabled to clock through its states when a Clock Detect signal is not asserted on line 200 and thus, not transmitted to the inverting enabling input 164. When the Clock Detect signal is asserted on line 200, the Gray counter 160 and multiplexer 130 are locked, thus locking the phase of the local clock at the despreader 100. As is shown below, the Clock Detect signal on line 200 is only asserted when the multiplexer 130 has selected a valid phase of the local clock.

The counters 140 and 150 are used to determine whether or not the current clock phase is valid and the Clock Detect signal should be asserted. Consider the situation where for the current phase of the local clock, the Clock Detect signal is not asserted. The divide-by-N counter 150 is reset when a first data bit detection signal is asserted by the correlator 103 at the output 105 and transmitted to the reset input 154 of the counter 150 via the AND-gate 156. (Note that the gate 156 is only open when the Clock Detect signal is not asserted as the Clock Detect signal is transmitted to the inverting input 157 of the AND-gate 156.) The counter 150 asserts an output signal at output 152 for one chip period every N chip time periods after the first data bit detection signal is received, i.e. the first data bit detection signal serves to synchronize the counter 150.

If a second data bit detection signal from output 105 of the correlator 103 coincides with an output signal of the counter 150 at the output 152, the Clock Detect signal is asserted on line 200. More particularly, the output 105 of the correlator 103 and the output 152 of the counter 150 are connected via an AND gate 146 to the RESET input 144 of the counter 140. When the second data bit detection signal from the correlator 103 coincides with the output of the counter 150, the counter 140 is reset and its overflow condition is cleared thereby asserting the Clock Detect signal on line 200 indicating that the current phase of the local clock is valid. Otherwise, the Clock Detect signal is not asserted and the multiplexer 130 then cycles to the next phase of the local clock. The counter 140 is enabled by a signal at its enabling input 148 when the gate 149 outputs a signal. The gate 149 receives as one input signal the output of the counter 150, and as its other input the current phase of the clock signal.

When at some point the Clock Detect signal is asserted on line 200, the Gray counter 160 and multiplexer 130 are frozen, thus freezing or locking the current phase of the clock. In addition, the reset input 154 of the counter 150 is disabled because the inverted input 157 of the gate 156 will be at binary 0. In this case, the counter 150 continues to produce an output every N chip periods synchronized to the last data bit detection signal at the output 105 of the correlator 103 before the Clock Detect signal was asserted. When at some point synchronization is lost between the current phase of the local clock and the clock of the arriving chip stream, this will show up as a loss of coincidence between the output signals of the counter 150 and data detection signals received from the output 105 of the correlator 103. When this loss of coincidence occurs, e.g. when there is a predetermined number of missing data bit detection signals at the counter 140, the counter 140 overflows so that the Clock Detect signal on line 200 is no longer asserted.

The length of the counter 140 (i.e. the number of states between the "reset" state and the "overflow" state) depends on the number of consecutive "loss of coincidence" events one wants to use as an indication of loss of clock synchronization. This number enables the circuit to coast through periods of missing or unexpected threshold crossings which may be caused by error bursts in the communications channel, without cycling to the next clock phase.

When there is such a loss of synchronization, the Gray counter 160 causes the multiplexer to again cycle through the M possible phases of the local clock until a valid phase is again found. In the case when packets are being received, preferably clock acquisition takes place only once per packet.

The clock recovery circuit utilized in the despreader 100 may be viewed as a coarse phase locked loop in that a local clock is varied in increments of phase until a valid phase is found, in which case the phase of the local clock is locked.

The operation of the despreader 100 of FIG. 3 may be summarized as follows. The indication of a valid phase of the local clock is called Clock Detect and is derived from a negation of the overflow condition of the counter 140. More particularly, the counter 140 is reset and its overflow condition is cleared when a data bit detection signal occurs one data bit period after the previous data bit detection signal as expected. This causes the Clock Detect signal to be asserted on line 200. When a data bit detection signal does not occur at the expected instant the counter 140 is not reset. When a predetermined number of data bit detection signals do not occur at the expected instant, the counter 140 overflows and the Clock Detect signal is de-asserted.

A data bit detection signal from the output 105 of the correlator 103 also synchronizes the divide-by-N counter 150 when the Clock Detect signal is not asserted so that the counter 150 produces an output signal N chip periods after the synchronizing data detection signal. If the output of the counter 150 coincides with the next data detection signal from the correlator 103, the counter 140 is reset thus asserting Clock Detect. This prevents the counter 150 from being resynchronized and the phase of the local clock is locked. As long as Clock Detect is asserted, the counter 150 produces pulses at the bit rate and synchronized with the last data detection signal before Clock Detect was asserted. When at some point, the output signals of the counter 150 no longer coincide with the data detection signals of the correlator 105 for a number of consecutive instances determined by the length of the counter 140, the counter 140 overflows and the Clock Detect signal is no longer asserted indicating that the local clock is no longer synchronized with the arriving chip stream.

As indicated previously, the Clock Detect signal on line 200 is utilized to enable a Gray counter 160 that cycles through the M adjacent phases of the local clock until a valid phase is found. For the case when M=4, the M phases of the local clock are generated by a delay line network made up of delays 112, 114, 116 and are selected by the multiplexer 130 under the control of the Gray counter 160. Preferably, consecutive states of the Gray counter select adjacent phases of the local clock.

In a particular embodiment of the invention, the output of the counter 140 may be combined using an AND gate (not shown) with a signal indicating the strength of the received signal so that the Clock Detect signal is only asserted when the received signal strength is above a certain level.

When packets are being detected, the Clock Detect signal can be used to signal the start of reception of a packet to depacketization and other processing circuitry.

In an alternative embodiment of the invention, instead of sequentially cycling through the M phases of the local clock and locking the phase as soon as an indication is obtained that one of the phases is valid, all M phases of the local clock are tested sequentially by switching phases after N chip periods. An indication of valid or invalid for each phase is obtained. Based on the pattern of valid and invalid phases, the "best" phase of the local clock is determined. Preferably, in a packetized spread spectrum system, this local clock acquisition process is carried out once per packet.

An indication that a particular phase is valid is that the current threshold crossing obtained with the current phase occurs N chip periods after a previous threshold crossing obtained with the previous phase. Similarly, an indication that a particular phase is invalid is that a current threshold crossing for a current phase does not occur as expected N chips periods after a previous threshold crossing obtained with a previous phase. For reasons to be described below, the phases are tested in the sequence $\phi_0 \rightarrow \phi_3 \rightarrow \phi_2 \rightarrow \phi_1 \rightarrow \phi_0$.

When a pattern of invalid and valid indications are obtained for all M phases of the local clock, a table stored in a memory or an equivalent circuit may be utilized to look up the best phase, which phase is then locked.

This acquisition process takes MxN chip periods. Instead of testing the M local clock phases sequentially, they may be tested in parallel. M shift registers and corresponding correlators are clocked by the M phases in parallel to simultaneously test each of the M phases by comparing the occurrence and relative timing of correlation threshold crossings from the correlators simultaneously. This clock acquisition process is hardware intensive, but takes only N chip periods.

Figure 4:
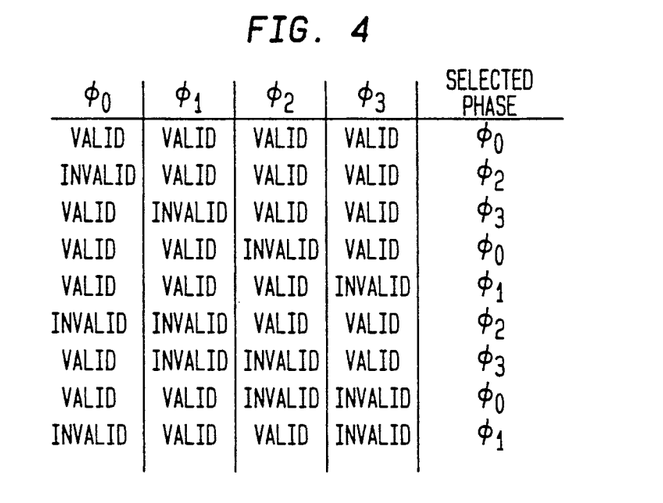
FIG. 4 shows a lookup table for use in an alternative clock recovery scheme in accordance with an alternative illustrative embodiment of the present invention.

An example of a table which may be used to obtain the best phase from a pattern of valid and invalid phases is shown in FIG. 4. This table may be understood as follows. A phase of the local clock is valid if the triggering transitions occur in the middle portion of the chip time periods when the chips have a well defined value and not too close to the chip edges. Alternatively, a phase of the local clock is invalid if the triggering transitions are too close to or outside the chip edges. Assuming a sufficiently small amount of errors in the received chip stream, because the receiver and transmitter clocks are nominally at the same frequency, timing errors alone in the local receiver clock will cause at most two adjacent phases to be invalid. In other words, at most two adjacent phases will have their triggering transitions outside the portion of the chip time periods when the chips have well defined values. Thus, the table of FIG. 4 accounts for the situation when all phases are valid, when three consecutive phases are valid, and when two consecutive phases are valid. When all four phases are valid, the selected phase is chosen arbitrarily. When three consecutive phases are valid, the middle phase is the selected phase, as the triggering transition of the middle phase is closest to the middle of the corresponding chip so a greater amount of drift between the local receiver clock and the transmitter clock is possible before desynchronization takes place. When two adjacent phases are valid, the selected phase is chosen arbitrarily.

Figure 5:
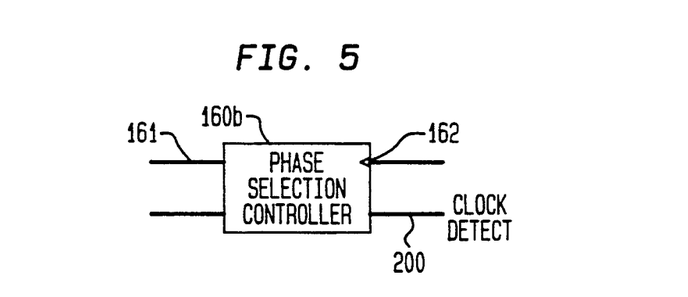
FIG. 5 schematically illustrates a modification of the clock recovery circuit of FIG. 3 for use in the alternative clock recovery scheme.

To carry out the above-described clock acquisition technique, the clock recovery circuit 300 of FIG. 3 is modified so that the Gray Counter 160 is replaced by a phase selection controller. FIG. 5 schematically illustrates a phase selection controller 160B for use in the clock recovery circuit 300 of FIG. 3. Like elements in FIGS. 3 and 5 have the same identifying numerals. Thus, a clock signal for the phase selection controller 160B at half the desired data bit rate is received at the clock input 162. In addition, signals on the lines 161 are used to control the multiplexer 130 to select a particular one of the M phases. In the phase selection controller 160B, the Clock Detect signal on line 200 is used as a validity/invalidity indicator for each of the M phases while the acquisition procedure is being carried out. In addition, de-assertion of the Clock Detect signal is used to reenter the acquisition procedure when synchronization is lost. The phase section controller 160B illustratively includes means (not shown) for storing a validity/invalidity indication for each of the M phases and a memory (not shown) for storing a lookup table such as that illustrated in FIG. 4. Based on the pattern of valid/invalid indications for the M phases, the memory provides a selected phase of the local clock which is then locked.

As indicated above, the phases should preferably be tested in an order such that one is always switching to an earlier place (i.e. $\phi_0 \rightarrow \phi_3 \rightarrow \phi_2 \rightarrow \phi_1 \rightarrow \phi_0$). If the phases are tested in an order such that one switches to a later phase (i.e. $\phi_0 \rightarrow \phi_1 \rightarrow \phi_2 \rightarrow \phi_3 \rightarrow \phi_0$) several problems may result.

Figure 6A:
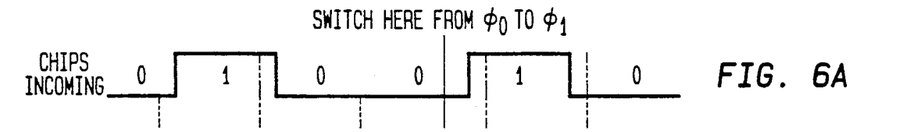
FIGS. 6A-6E and 7A-7C show what happens if the clock phases are not tested in the proper sequence in the alternative clock recovery scheme.
Figure 6B:
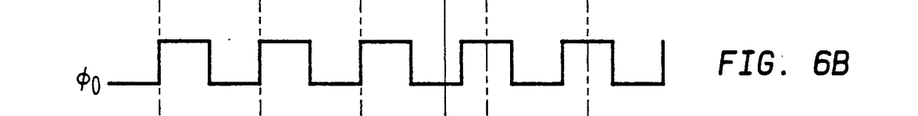
Figure 6C:
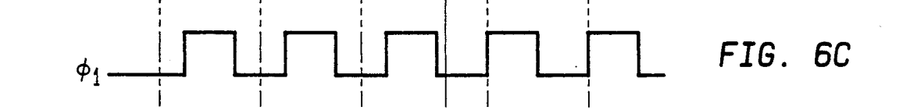
Figure 6D:
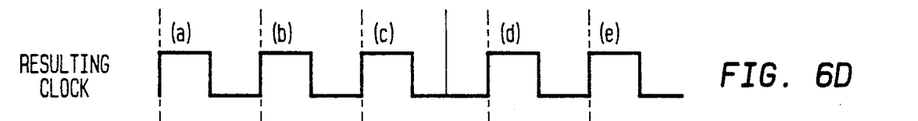
Figure 6E:
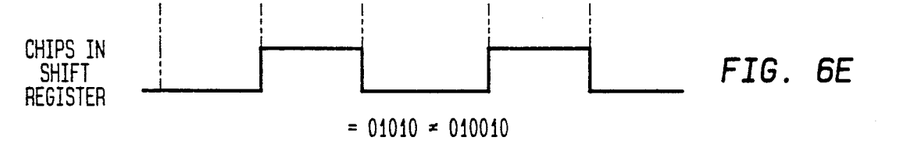

One such problem may be understood in connection with FIGS. 6A-6E. FIG. 6A shows an incoming group of chips having the values 010010. The local receiver clock should clock this sequence of chips into the shift register at the receiver. However, when there is switching to a later phase, it is possible for a chip to be lost. FIG. 6B shows the local clock phase $\phi_0$ and FIG. 6C shows the clock phase $\phi_1$. The triggering transition of these clock phases is the leading edge which occurs once every 360 degrees. At the time indicated, the local clock is switched from $\phi_0$ to the later phase $\phi_1$. The overall resulting clock is shown in FIG. 6D. The triggering transitions of this resulting clock signal are labeled a, b, c, d, e. There is a very long delay between the triggering transitions c and d because this is where the switching between $\phi_0$ and the later phase $\phi_1$ takes place. This causes one chip to be missed so that as shown in FIG. 6E the sequence 01010 is clocked into the shift register rather than the desired sequence 010010.

Figure 7A:
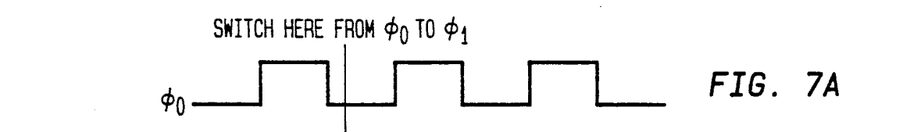
Figure 7B:
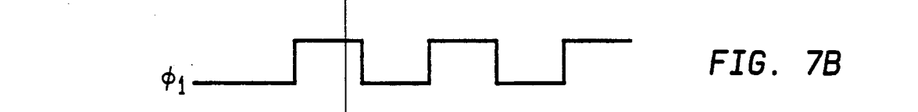
Figure 7C:
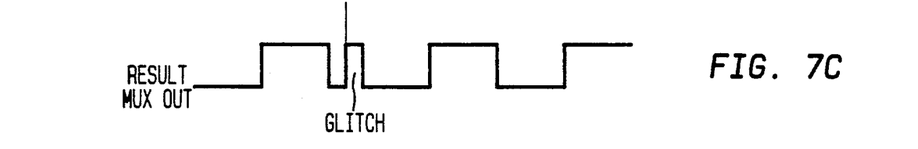

Another problem with switching to a later phase is that glitches in the multiplexer 130 may occur. The multiplexer should only be switched to a later phase when the clock signal of the current phase is in the same binary state as the clock signal of the later phase. The glitch which results when the current phase and later phase are in opposite binary states is shown in FIGS. 7A, 7B and 7C. FIG. 7A shows the phase $\phi_0$ and FIG. 7B shows the later phase $\phi_1$. FIG. 7C shows the resulting clock signal including a glitch when the switch from $\phi_0$ to $\phi_1$ takes place when $\phi_0$ to $\phi_1$ are in opposite binary states.

Neither of the two problems mentioned above will occur when the switching is from a later phase to an earlier phase.

In short, a unique clock recovery method and circuit for a spread spectrum communication system has been disclosed, wherein M phases of a locally generated receiver clock are cyclically tested for validity by determining whether or not a data bit is recovered at the expected instant. The phase is locked as soon as an indication is obtained that one of the phases is valid. Alternatively, all M phases of the local clock are tested for validity or invalidity and the "best" phase of the local clock is selected based on the particular pattern of valid and invalid phases.

Finally, the above-described embodiments of the invention are intended to be illustrative only. Numerous alternative embodiments of the invention may be devised by those skilled in the art, without departing from the spirit and scope of the following claims.

I claim:

1. A method for synchronizing a local receiver clock with a transmitter clock, said receiver clock being located at a receiver which receives a transmitted digital data bit stream in a spread spectrum format wherein each data bit comprises N chips, wherein N is an integer greater than one, said method comprising the steps of:
   at said receiver, cycling through a plurality of phases of said local receiver clock, and for each of said phases determining whether the phase is valid and the local receiver clock and transmitter clock are synchronized by determining if a correlation threshold crossing of a second data bit of said data bit stream is detected at said receiver at an unexpected instant N chip time periods after a correlation threshold crossing of a first data bit is detected, and
   halting said cycling and locking the phase of said local receiver clock when one of said phases is determined as being valid.

2. A method for synchronizing a local receiver clock with a transmitter clock, said receiver clock being located at a receiver which receives a transmitted digital data bit stream, said method comprising the steps of:
   at said receiver, cycling through a plurality of phases of said local receiver clock, and for each of said phases determining whether the phase is valid and the local receiver clock and transmitter clock are synchronized by determining if a second data bit of said data bit stream is detected a predetermined time interval after a first data bit is detected, and
   halting said cycling and locking the phase of said local receiver clock when one of said phases is determined as being valid,
   wherein said receiver receives a signal in a spread spectrum format comprising N chips per data bit, where N is an integer greater than 1, and wherein the step of determining if one of said phases is valid has a duration of 2N chip time periods and comprises determining if a correlation threshold crossing of the second data bit occurs N chip time periods after a correlation threshold crossing of the first data bit.

3. The method of claim 2 wherein said plurality of phases comprises M phases, wherein M is an integer greater than one, and wherein said cycling step lasts a maximum of 2MN chip time periods.

4. The method of claim 3 wherein said signal in spread spectrum format comprises data packets and wherein each packet has a preamble of at least 2M data bits.

5. The method of claim 4 wherein said synchronizing method is carried out no more than once per packet.

6. The method of claim 2 wherein said method further comprises resuming said cycling and determining steps if after a certain time period said one phase is no longer valid.

7. A method for recovering a local clock at a receiver which receives a digital signal in spread spectrum format, wherein said signal comprises N chips per data bit, where N is an integer greater than one, said method comprising,
   cycling through M phases of said local clock, where M is an integer greater than one, at a rate which is at most one-half a bit rate of said signal,
   for each of said phases, determining if the phase is valid by determining if a correlation threshold crossing of a second data bit of said signal is detected at said receiver at an expected instant N chip time periods after a correlation threshold crossing of a first data bit is detected at said receiver, and
   halting said cycling step and locking the phase of said local clock at a particular one of said M phases in response to said determining step, when it is determined that a particular one of said phases is valid.

8. A circuit forming part of a receiver for synchronizing a local receiver clock with a transmitter clock, said receiver receiving a digital signal in spread spectrum format wherein each bit comprises N chips, where N is an integer greater than one, said circuit comprising:
   means for cycling through a plurality of phases of said local receiver clock at a rate which is at most one-half a bit rate of the digital signal received at said receiver,
   means for determining if each of said phases is valid by determining if a correlation threshold crossing of a second data bit of said signal is detected at said receiver at an expected instant N chip time periods after a correlation threshold crossing of a first data bit of said signal is detected, and means for locking the phase of said local receiver clock when said determining means indicates one of said phases is valid.

9. A clock recovery circuit for synchronizing a local clock at a receiver with a digital signal in spread spectrum format, wherein said signal comprises N chips per data bit, where N is an integer greater than one, said circuit comprising:

means for cycling through M phases of said local receiver clock, where M is an integer greater than one, at a rate which is at most one-half a bit rate of said signal, means for determining if each of said phases is valid by determining if a correlation threshold crossing of a second data bit of said signal is detected at said receiver at an expected instant N chip time periods after a correlation threshold crossing of a first data bit is detected at said receiver, and means for locking the phase of said local receiver clock when said determining means indicates one of said phases is valid.

10. The circuit of claim 9 wherein said cycling means comprises means for generating a periodic signal having the same nominal frequency as said spread spectrum signal, a delay network for deriving a plurality of phases of said periodic signal to form said plurality of phases of said local receiver clock, and multiplexer means for sequentially selecting particular ones of said phases of said local clock.

11. A clock recovery circuit for synchronizing a local clock at a receiver with a signal in spread spectrum format, wherein said signal comprises N chips per data bit, where N is an integer greater than one, said circuit comprising:

means for cycling through M phases of said local receiver clock, where M is an integer greater than one, means for determining if each of said phases is valid by determining if a correlation threshold crossing of a second data bit is detected at said receiver N chip time periods after a correlation threshold crossing of a first data bit is detected at said receiver, and means for locking the phase of said local receiver clock when said determining means indicates one of said phases is valid, wherein said determining means comprises first circuit means for asserting a first signal N chip periods after said first data bit is detected, and second circuit means for asserting a second, clock detect signal when said second data bit is detected N chip periods after said first data bit is detected, said second circuit means asserting said second signal only when said first signal coincides with the detection of said second data bit.

12. The circuit of claim 11 wherein said locking means comprises third circuit means for locking the phase of said local clock selected by said multiplexer when said second signal is asserted.

13. A despreader for use in a spread spectrum communication system comprising:

a shift register for receiving a signal in spread spectrum format wherein each data bit is encoded by N chips, a correlator for determining at each chip time period of said spread spectrum signal the number of matches between the chips in the shift register and a predetermined reference sequence and for producing a data bit detection signal when the number of matches exceeds or falls below a correlation threshold, means for generating and cycling through a plurality of phases of a local clock, first circuit means for producing an output signal N chip time periods after receiving a first bit detection signal from said correlator, second circuit means for asserting a clock detect signal when a second bit detection signal from said correlator coincides with said output signal of said first circuit means, and 14. A method for synchronizing a local receiver clock with a transmitter clock, said receiver clock being located at a receiver which receives a transmittal digital data bit stream comprising N chips per data bit where N is an integer greater than one, said method comprising the steps of:

generating a plurality of phases of said local receiver clock, determining whether each of said phases is valid or invalid by determining if a correlation threshold crossing of a second data bit of said data bit stream is detected at said receiver at an expected instant N chip time periods after a correlation threshold crossing of a first data bit of said data bit stream is detected at said receiver to generate a pattern of valid and invalid phases, and selecting a particular one of said phases based on the pattern of valid or invalid phases and locking the local clock in the selected phase.

15. The method of claim 14 wherein said generating step comprises cycling through said phases by switching to the next earlier phase after N chip time periods.

16. The method of claim 14 wherein said selecting step comprises obtaining said selected phase from a memory depending on the pattern of valid or invalid phases.

17. A method for synchronizing a local clock at a receiver with a signal received at said receiver in spread spectrum format, wherein said signal comprises N chips per data bit, where N is an integer greater than one, said method comprising cycling through phases M of said local receiver clock at a rate which is at most one-half a bit rate of said signal, where M is an integer greater than one, and determining whether each of said phases is valid or invalid by determining whether or not a correlation threshold crossing of a second data bit of said signal is detected at said receiver at an expected instant N chip time periods after a correlation threshold crossing of a first data bit of said signal is detected at said receiver.

18. The method of claim 17 wherein said method further comprises halting said cycling and locking the phase of the local clock at the first one of said phases determined to be valid.

19. The method of claim 17 wherein said method further comprises the steps of selecting a particular one of said phases based on the pattern of valid and invalid phases obtained as a result of said cycling and determining steps and locking the local clock in the selected phase.

20. A circuit forming part of a receiver for synchronizing a local receiver clock with a transmitter clock comprising means for cycling through a plurality of phases o said local receiver clock, and means for determining if a phase is valid or invalid by determining whether or not a correlation threshold of a second data bit of a digital signal is detected at said receiver at an expected instant N chip time periods after a correlation threshold crossing of a first data bit of said digital signal is detected at said receiver, where N is an integer greater than one.

21. The circuit of claim 20 wherein said circuit further comprises means for halting said cycling and locking the phase of said local clock at the first one of said phases determined to be valid.

22. The circuit of claim 20 wherein said circuit further comprises means for selecting a particular one of said phases based o the pattern of valid and invalid phases produced by said cycling and determining means, and for locking the local clock in the selected phase.

* * * * *